(12) United States Patent
Suzuki

(10) Patent No.: US 7,188,651 B2
(45) Date of Patent: Mar. 13, 2007

(54) PNEUMATIC TIRE WITH TREAD HAVING CAP LAYER AND BASE LAYER

(75) Inventor: Kazuya Suzuki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 81 days.

(21) Appl. No.: 10/879,088

(22) Filed: Jun. 30, 2004

(65) Prior Publication Data

US 2005/0039834 A1 Feb. 24, 2005

(30) Foreign Application Priority Data

Aug. 20, 2003 (JP) ............................. 2003-295764

(51) Int. Cl.
*B60C 1/00* (2006.01)
*B60C 11/00* (2006.01)

(52) U.S. Cl. ............................ 152/209.5; 152/209.18

(58) Field of Classification Search ............ 152/209.5, 152/209.18, DIG. 3
See application file for complete search history.

(56) References Cited

U.S. PATENT DOCUMENTS

| | | | | |
|---|---|---|---|---|
| 2,708,957 | A * | 5/1955 | Constantakis et al. | 152/DIG. 3 |
| 4,456,046 | A * | 6/1984 | Miller | 152/209.18 |
| 4,478,266 | A * | 10/1984 | Pierson et al. | 152/209.5 |
| 5,582,661 | A * | 12/1996 | Winter | 152/209.18 |
| 5,647,926 | A * | 7/1997 | van der Meer et al. | 152/DIG. 3 |
| 6,095,217 | A * | 8/2000 | Nakamura et al. | 152/209.5 |
| 6,336,486 | B1 * | 1/2002 | Iwasaki et al. | 152/209.18 |
| 6,561,244 | B2 * | 5/2003 | Zanzig et al. | 152/209.5 |
| 2005/0045258 | A1 * | 3/2005 | Suzuki | 152/209.5 |

FOREIGN PATENT DOCUMENTS

| | | |
|---|---|---|
| DE | 100 14 892 A1 | 10/2001 |
| EP | 0 301 138 A1 | 2/1989 |
| EP | 538723 * | 4/1993 |
| EP | 780245 * | 6/1997 |
| EP | 0 818 501 A1 | 1/1998 |
| JP | 3-169723 * | 7/1991 |
| JP | 9-136510 A | 5/1997 |
| JP | 2003-104009 A | 4/2003 |

OTHER PUBLICATIONS

Machine translation for Japan 2003-104009.*

* cited by examiner

*Primary Examiner*—Steven D. Maki
(74) *Attorney, Agent, or Firm*—Birch, Stewart, Kolasch & Birch, LLP

(57) ABSTRACT

A tread (12) of a tire (10) has a two-layer structure. The tread (12) includes a base layer (23) provided on an inside in a radial direction and a cap layer (24) provided on an outside in the radial direction. The outer peripheral surface of the cap layer (24) constitutes a tread surface (17). The tread surface (17) is provided with a groove (18). A plurality of circular land portions (21) is formed by the adjacent grooves (18). The base layer (23) is provided with a convex portion (26) extended in a circumferential direction. A plurality of convex portions (26) is arranged in an axial direction. A height (h1) of the convex portion (26) is set to be 15% to 50% of a depth (d1) of the groove (18). A position (a dimension Δh) of a base bottom portion (29) of the base layer (23) based on an inner bottom portion (28) of the groove (18) is set at 1.6 mm or less from the inner bottom portion (28) of the groove (18).

4 Claims, 4 Drawing Sheets

PNEUMATIC TIRE WITH TREAD HAVING CAP LAYER AND BASE LAYER

This application claims priority on Patent Application No. 2003-295764 filed in Japan on Aug. 20, 2003.

BACKGROUND OF THE INVENTION

1. Field of the Invention

The present invention relates to a pneumatic tire (hereinafter referred to as a "tire"). More specifically, the present invention relates to a structure of a tire in which a tread has a two-layer structure.

2. Description of the Related Art

As shown in FIG. 4, a tire 1 comprises a carcass 2a, a belt 2b for reinforcing the carcass 2a, a sidewall 2c, a bead 2d, and a tread 3. The tread 3 includes a tread rubber layer 3a provided to cover the outer peripheral surfaces of the carcass 2a and the belt 2b. The outer peripheral surface of the tread rubber layer 3a constitutes a tread surface. A buttress portion 7 is provided in a boundary part between the tread rubber layer 3a and the sidewall 2c. The tread rubber layer 3a is generally constituted by a different kind of rubber from rubbers constituting the carcass 2a and the sidewall 2c. The tread rubber 3a is provided with a plurality of grooves 4 in a circumferential direction. As a result of the formation of the grooves 4, a tread pattern is formed on the outer peripheral surface of the tread rubber layer 3a.

In consideration of the durable year of the tire 1, a thickness a of the tread rubber layer 3a is to be a certain thickness. The reason is that the tread rubber layer 3a is provided to cover the outer peripheral surfaces of the carcass 2a and the belt 2b, and furthermore, the groove 4 is formed. More specifically, it is necessary to set a depth c of the groove 4 to be a certain depth or more. If the depth c of the groove 4 is set to be great, however, it is a matter of course that the thickness a of the tread rubber layer 3a is increased. As a result, the weight of the tire 1 is increased, and furthermore, the high-speed durability of the tire 1 or the like is deteriorated.

In recent years, a tire to be attached to a vehicle with an increase in the speed of a vehicle has required a high durability at a high speed. In order to enhance the durability at a high speed, conventionally, the following means has been employed: (1) the thickness a of the tread rubber layer 3a is set to be small; (2) a band for reinforcing the belt 2b is provided; and (3) the material of a rubber constituting the tread rubber layer 3a is of a low heat generation type. According to the means of (1), the amount of heat generated from the tread 3 during running is decreased. Consequently, high-speed running can be continuously carried out. According to the means of (2), the lifting of the belt 2b and the carcass 2a in the running is prevented. Consequently, the high-speed running can be continuously carried out. According to the means of (3), the amount of heat generated from the tire during the running is decreased. Consequently, the high-speed running can be continuously carried out.

In the case in which the means of (1) is employed, however, it is necessary to ensure the depth c of the groove 4 to be a certain depth or more in order to maintain the durable year of the tire 1. Consequently, a dimension b between the bottom of the groove 4 and a tire body is decreased. If the dimension b is decreased, a ride comfort is deteriorated and a noise is increased. If the dimension b is decreased, furthermore, a crack is apt to be generated on the bottom of the groove. On the other hand, in the case in which the means of (2) is employed, the weight of the tire 1 is increased. Moreover, the ride comfort is deteriorated and the noise is increased. Furthermore, the rolling resistance of the tire 1 is increased. In the case in which the means of (3) is employed, the grip force of the tire 1 is reduced so that a running stability is deteriorated and a braking performance or the like is degraded.

Under the circumstances, conventionally, the tread rubber layer 3a has a two-layer structure including an outer layer 5 and an inner layer 6 in order to enhance a durability at a high speed while maintaining the durable year of the tire 1. The outer layer 5 (hereinafter referred to as a "cap layer") is formed of a rubber having a high gripping property and the inner layer 6 (hereinafter referred to as a "base layer") is formed of a rubber of a low heat generation type.

SUMMARY OF THE INVENTION

The present invention has been made in such a background. It is an object of the present invention to provide a tire in which the structure of a tread rubber layer (that is, a two-layer structure) is improved, resulting in a further enhancement in a durability at a high speed.

(1) In order to attain the object, a pneumatic tire according to the present invention comprises a tread having a base layer and a cap layer. The base layer is provided on an inside in a radial direction and the cap layer is provided on an outside in the radial direction. The outer peripheral surface of the cap layer constitutes a tread surface. The outer peripheral surface of the cap layer is provided with a groove so that a plurality of circular land portions is formed on the outer peripheral surface. The base layer is provided with a plurality of circular convex portions which is arranged in an axial direction, is protruded in the radial direction and is extended in a circumferential direction. A plurality of circular convex portions is provided in one circular land portion and a height h thereof is set to be 15% to 50% of a depth d1 of the groove. A height Δh of a base bottom portion of the base layer is set to be equal to or smaller than 1.6 mm from an inner bottom portion of the groove.

(2) It is preferable that the base layer should be constituted by a stirene-butadiene rubber. It is preferable that the base layer should have a hardness set to be lower than that of the cap layer and should have a JIS A hardness set to be 55 to 65. It is preferable that two to five circular convex portions should be provided in one land portion.

According to the present invention, a durability at a high speed of the tire can be enhanced and a sufficient durable year can be ensured as will be described in the following examples.

DESCRIPTION OF THE PREFERRED EMBODIMENTS

The present invention will be described below in detail based on a preferred embodiment with reference to the drawings.

Figure 1:
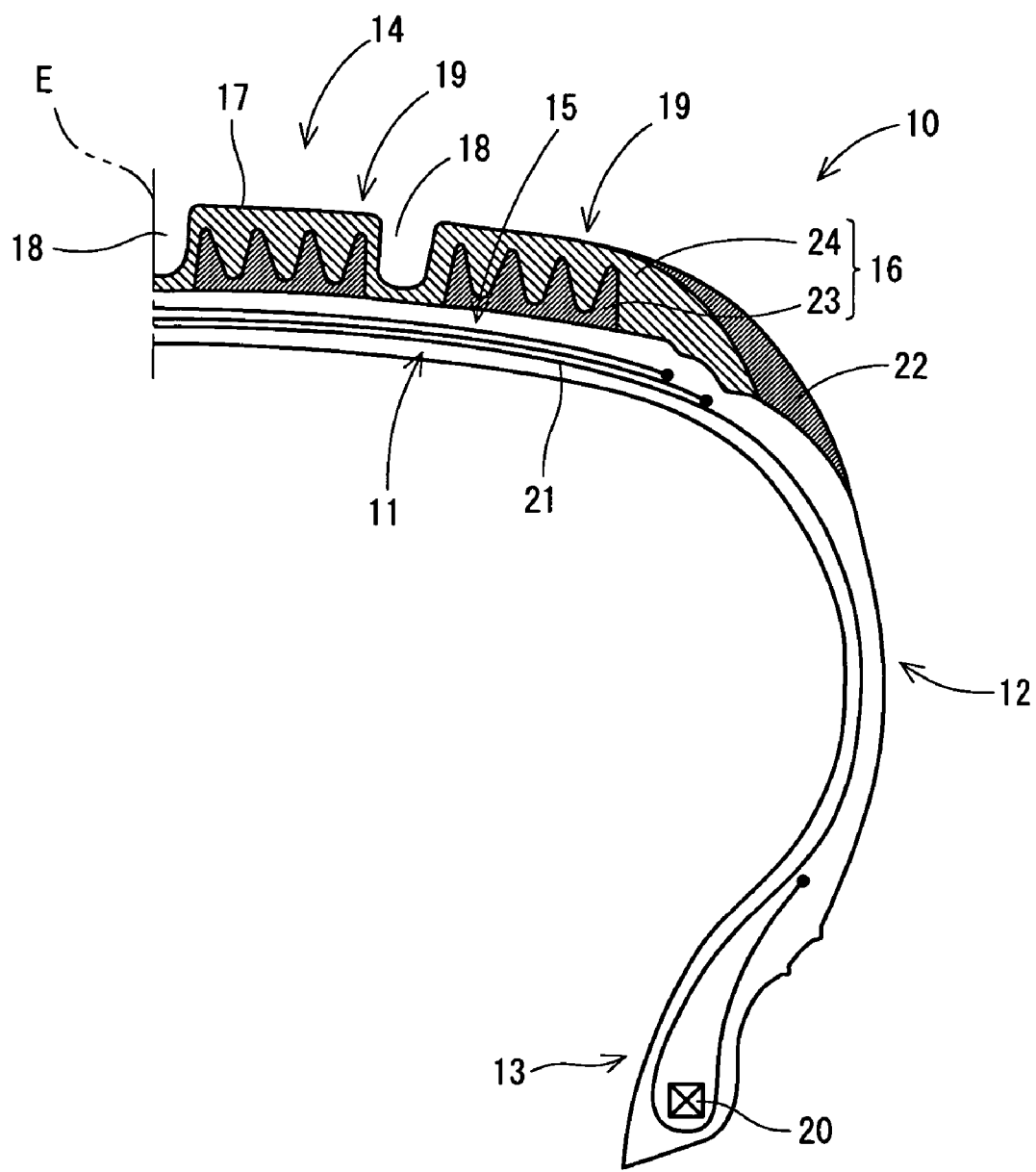
FIG. 1 is an enlarged sectional view showing the main part of a tire according to an embodiment of the present invention.

FIG. 1 shows a section taken along a plane which passes through the center of a tire 10 and is orthogonal to an equator plane E of the tire 10. In FIG. 1, a vertical direction is set to be a radial direction of the tire 10 and a transverse direction is set to be an axial direction of the tire 10. The tire 10 takes an almost symmetrical shape about the equator plane E, and has a carcass 11, a sidewall 12, a bead 13 and a tread 14 and is provided with a belt 15 for reinforcing the carcass 11.

The tread 14 includes a tread rubber layer 16 formed of a crosslinked rubber. The tread rubber layer 16 is formed to take the shape of an almost circular arc to be outward convex in the radial direction. The outer peripheral surface of the tread rubber layer 16 constitutes a tread surface 17 to come in contact with a road surface. The tread surface 17 is provided with a groove 18. Consequently, a land portion 19 is formed on the tread 14. By the presence of the groove 18 and the land portion 19, a tread pattern is formed. The structure of the tread rubber layer 16 will be described below in detail.

The sidewall 12 is extended inward in the radial direction from both ends of the tread 14. A buttress portion 22 is provided in a boundary part between the sidewall 12 and the tread 14. The sidewall 12 is also formed of a crosslinked rubber. By a flexure, the sidewall 12 absorbs a shock generated from the road surface. Moreover, the sidewall 12 prevents the external damage of the carcass 11.

The bead 13 has a bead core 20. The bead core 20 is formed circularly. The bead core 20 is formed by a plurality of non-extensible wires (typically, wires formed of steel).

The carcass 11 includes a carcass ply 21. The carcass ply 21 constitutes the frame of the tire 10. The carcass ply 21 is provided along the inner peripheral surfaces of the tread 14, the sidewall 12 and the bead 13 and is laid over the bead core 20. The belt 15 is obtained by covering a belt cord with a crosslinked rubber. The belt 15 covers and reinforces the carcass 11.

The carcass 11, the belt 15, the sidewall 12, the bead 13 and the like are manufactured by a general method which has conventionally been employed, and these are constituted integrally in the tire 10 which is formed.

As described above, the tread 14 includes the tread rubber layer 16 formed of the crosslinked rubber. The buttress portion 22 is formed in the boundary part between the tread rubber layer 16 and the sidewall 12. The present embodiment features the structure of the tread rubber layer 16. More specifically, the present embodiment is characterized in that:

(1) the tread rubber layer 16 has a two-layer structure including a base layer 23 and a cap layer 24;
(2) the cap layer 24 is provided with the groove 18 so that the tread pattern is constituted over the tread surface 17 and the land portion 19 (the circular land portion) is formed between the grooves 18; and
(3) the base layer 23 is formed to take a shape which will be described below and is provided in a position which will be described later.

Figure 2:
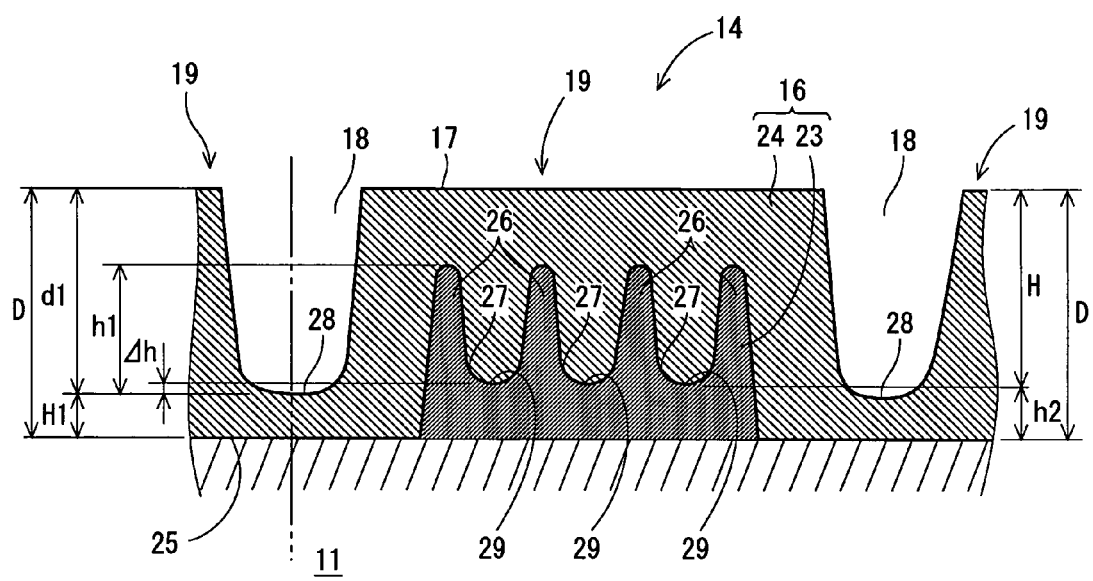
FIG. 2 is an enlarged sectional view showing the main part of the tread portion of the tire according to the embodiment of the present invention.

As shown in FIG. 2, the base layer 23 is formed like a comb protruded outward in the radial direction, and the cap layer 24 is provided to cover the base layer 23 at an outside in the radial direction. The base layer 23 and the cap layer 24 are constituted by a rubber (referred to as a "tread rubber"), respectively. The base layer 23 and the cap layer 24 are constituted by heating (crosslinking), for a predetermined time, a base material (rubber) to which a crosslinking agent or another compound is added. For the base material, it is possible to employ a natural rubber (NR), a stirene-butadiene rubber (SBR), a butadiene rubber (BR), an isoprene rubber (IR) or their mixtures, and particularly, it is preferable that the stirene-butadiene rubber (SBR) should be employed. Carbon black, silica or the like may be added as a reinforcing agent to the base material. Moreover, other various fillers may be added to the base material.

In the present embodiment, these reinforcing agents and the like are used. Therefore, the hardness of the base layer 23 is different from that of the cap layer 24. More specifically, the hardness of the base layer 23 has a JIS A hardness set to be 60 and the hardness of the cap layer 24 has a JIS A hardness set to be 64. The hardnesses of the base layer 23 and the cap layer 24 are not restricted to these values. It is preferable that the hardness of the base layer 23 should be set to be smaller than that of the cap layer 24 and both of the hardnesses should have the JIS A hardnesses set to be 55 to 65.

The groove 18 is provided on the outer peripheral surface of the cap layer 24 (the tread surface 17). The groove 18 is formed circularly on the tread surface 17 in the circumferential direction. In the present embodiment, the groove 18 is provided in the central part of the tread surface 17, and is provided symmetrically in an axial direction about the central part (see FIG. 1). Indeed, it is a matter of course that a large number of grooves 18 may be provided, and may be provided asymmetrically based on the equator plane E.

As shown in FIG. 2, the groove 18 is formed in such a manner that an internal wall surface thereof takes an almost U shape. In the present embodiment, a thickness D of the tread rubber layer 16 is set to be 10 mm and a depth d1 of the groove 18 is set to be 8.2 mm. Accordingly, a subtread gauge H1 is set to be 1.8 mm. The subtread gauge H1 represents a distance between an inner bottom portion 28 of the groove 18 and a bottom face 25 of the tread rubber layer 16. These dimensions D, d1 and H1 are properly designed and changed according to the specifications of a tire.

The base layer 23 is formed like a comb as described above, and includes a plurality of convex portions 26 (circular convex portions) as shown in FIG. 2. As shown in FIG. 1, these base layers 23 are arranged in the axial direction of the tire 10 and the convex portion 26 of each base layer 23 is provided to be buried in the land portion 19. More specifically, as shown in FIG. 2, the base layer 23 has four convex portions 26. Each of the convex portions 26 is arranged in the radial direction (the transverse direction in FIG. 2), and the adjacent convex portions 26 are provided smoothly and continuously by a circular arc portion 27. Although the number of the convex portions 26 is not restricted to four, it is preferable that the number of the convex portions 26 to be provided in one land portion 19 should be two to five.

A height h1 of the convex portion 26 is properly set to be 15% to 50% of the depth d1 of the groove 18. The height h1 of the convex portion 26 represents a distance between the top portion of the convex portion 26 and the inner bottom portion 28 of the groove 18. On the other hand, a dimension H from a base bottom portion 29 of the circular arc portion 27 (the base bottom portion of the base layer) to the tread surface 17 is set to be 8.0 mm. Since the thickness D of the tread rubber layer 16 is set to be 10 mm, accordingly, a dimension h2 from the base bottom portion 29 of the circular arc portion 27 to the bottom face 25 of the tread rubber layer 16 is set to be 2.0 mm.

A ratio of the base layer 23 to the cap layer 24 can be variously designed and changed. The ratio of the base layer 23 to the cap layer 24 represents a ratio of the dimension h2 to the dimension H. The ratio is preferably set to be h2:H=10:90 to 40:60, and furthermore, is more preferably set to be h2:H=20:80 to 30:70.

The base bottom portion 29 is placed in a position having a dimension Δh on the basis of the inner bottom portion 28 of the groove 18 and Δh≦1.6 mm is set. Thus, the dimension Δh is set to be 1.6 mm or less so that the following effects can be obtained.

If the dimension Δh is set to be greater than 1.6 mm, the base layer 23 is wholly exposed so that the grip force of the tire 10 tends to be greatly reduced at the last stage of the wear of the tire 10 (usually at a time that the depth of the groove 18 is 1.6 mm). However, Δh≦1.6 mm is set as in the present embodiment so that a rate at which the cap layer 24 remains on the tread surface 17 is increased at the last stage of the wear of the tire 10. Accordingly, a reduction in the grip force of the tire 10 can be suppressed.

While the base bottom portion 29 is placed on an outside in the radial direction (above in FIG. 2) on the basis of the inner bottom portion 28 of the groove 18 in the present embodiment, it is not restricted. The base bottom portion 29 may be positioned on an inside in the radial direction (below in FIG. 2) on the basis of the inner bottom portion 28 of the groove 18.

Figure 3:
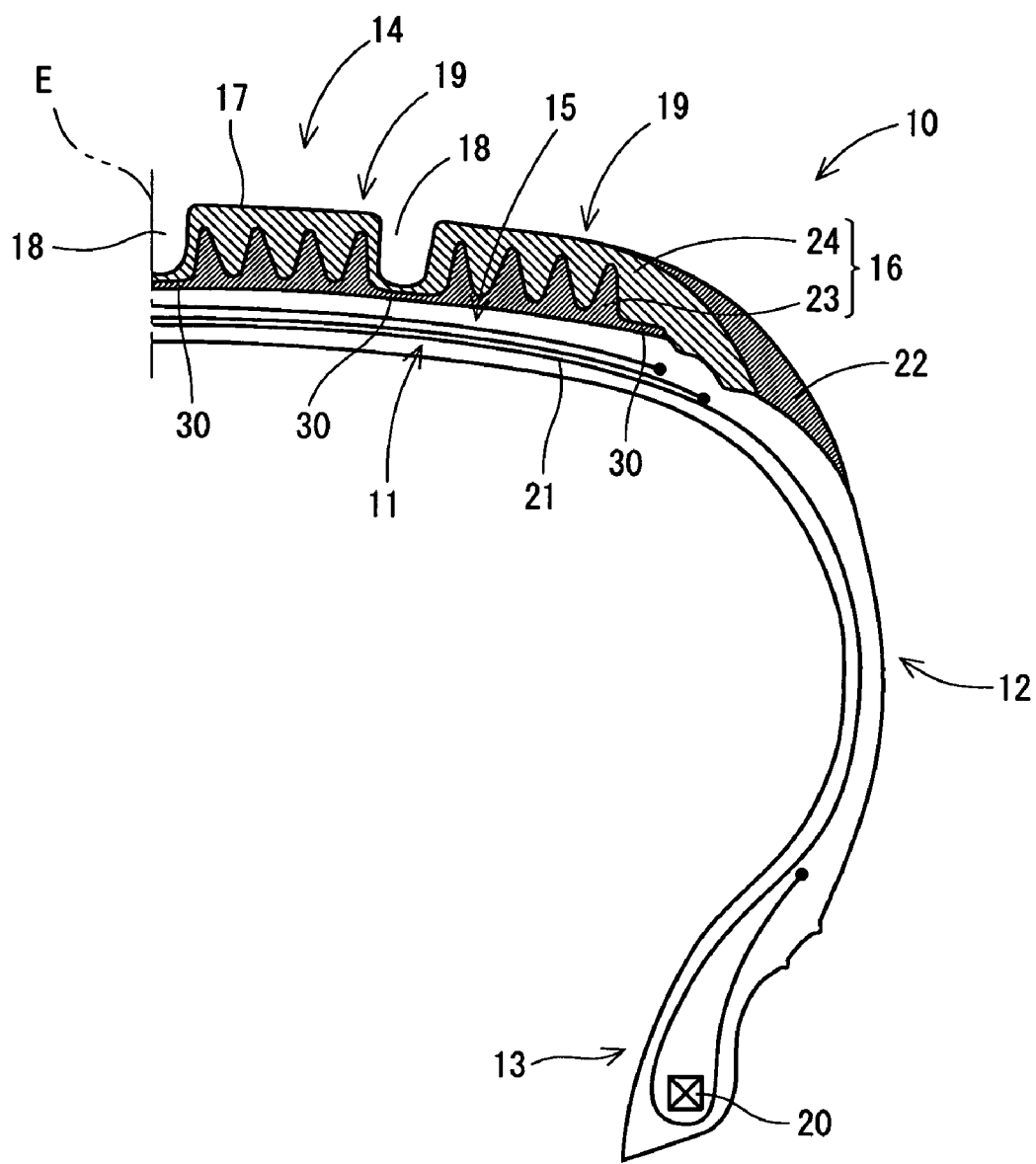
FIG. 3 is an enlarged sectional view showing the main part of a tire according to a variant of the embodiment of the present invention.
Figure 4:
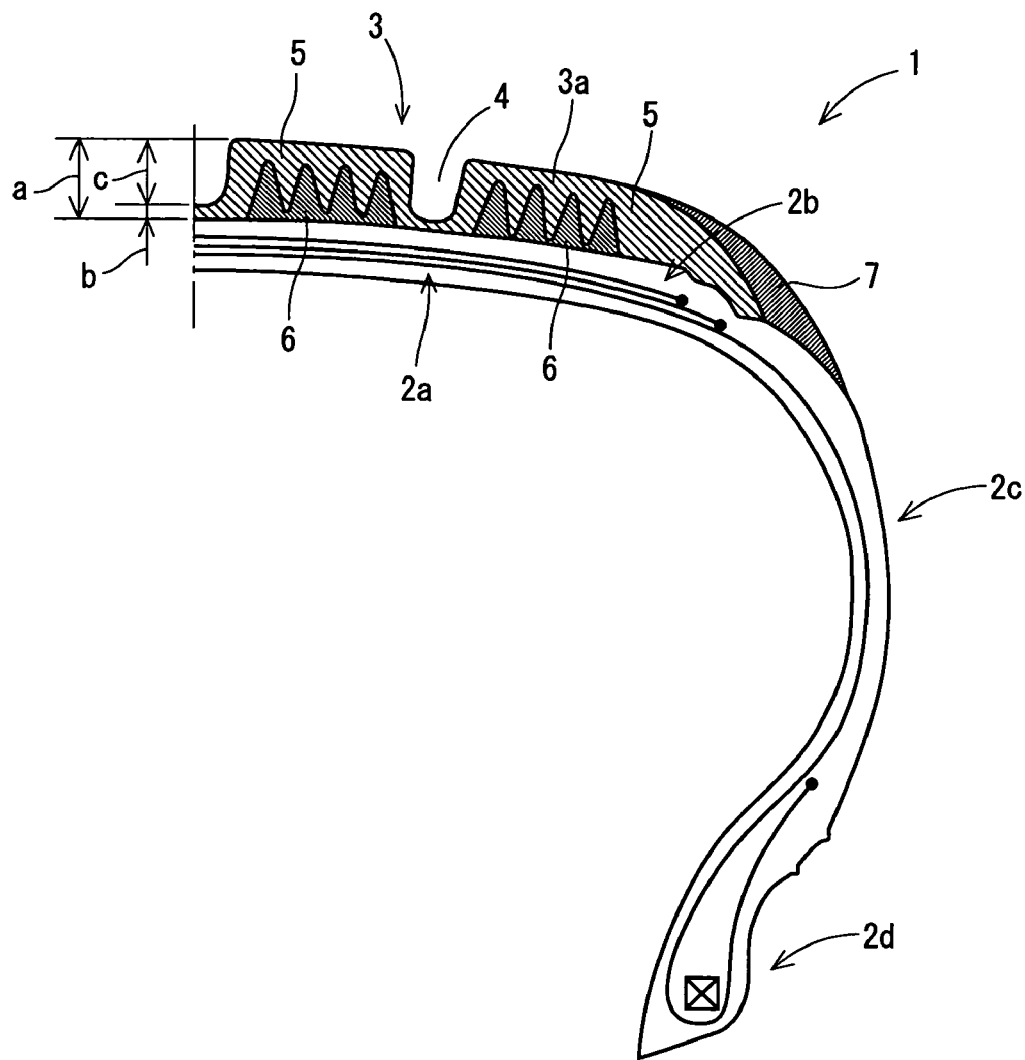
FIG. 4 is a view typically showing the structure of a conventional general tire.

While the base layer 23 is constituted to be formed in each land portion 19 as shown in FIG. 1 in the present embodiment, such a structure is not restricted. As shown in FIG. 3, a thin film layer 30 may be provided in the lower part of each base layer 23 (an inside in the radial direction) and each base layer 23 may be provided continuously through the thin film layer 30. The base layer 23 is thus provided continuously so that the following advantages can be obtained.

When the tire 10 is to be manufactured, a rubber sheet constituting the tread rubber layer 16 is subjected to extrusion molding. More specifically, a rubber constituting the cap layer 24 and a rubber constituting the base layer 23 are fed separately to one die plate and are extruded at the same time. Thus, the rubber sheet constituting the tread rubber layer 16 is formed. In the case in which the base layer 23 is continuously provided through the thin film layer 30, accordingly, there is an advantage that a molding work using the die plate can easily be carried out. Moreover, the thin film layer 30 is provided so that the rate of the area of the base layer 23 over the section of the tread layer 16 is increased and the heat generation of the tire 10 can be suppressed still more. As a result, it is possible to enhance a durability at a high speed of the tire 10.

EXAMPLES

Although the advantages of the present invention will be apparent below from examples, the present invention is not construed to be restricted to the description of the examples.

Table 1 shows the result of the execution of a comparison test over a conventional tire (comparative examples 1 to 4) for a durability at a high speed of a tire according to each of examples 1 to 8 of the present invention. This test is a durability test (JIS D4230) at a high speed by means of a drum testing machine based on JIS.

The specification of the tire according to each of the examples and the comparative examples is 225/55R16 (summer tire) 94V. The drum of the drum testing machine to be used in this test has a diameter of 1.7 m±1%. An initial speed in the test was set to be 240 km/h. Based on the JIS, the test was divided into six stages. The test was sequentially carried out from a first stage and a time required for the test in each stage is 10 minutes (JIS4230 D). In this test, the time required for the test was set to be 10 minutes from the first stage to a fourth stage and was set to be 20 minutes in fifth and sixth stages. In each of the examples and the comparative examples, a durability at a high speed of the tire is evaluated based on the stage of the test and the time required for the test when the tire is broken. This is indicated in a column of "breaking speed·time" in the Table 1.

The details of the tire according to each of the examples and the comparative examples are as follows.

Example 1

A tread rubber layer has a thickness of 10.0 mm and a groove has a depth of 8.2 mm. For a cap layer, a ratio to the tread rubber layer is 80% and a rubber hardness (JIS A hardness) is 64. On the other hand, for a base layer, the ratio to the tread rubber layer is 20% and the rubber hardness is 60. The number of convex portions is two. A height h1 of the convex portion is 3 mm which is 37% of a depth d1 of the groove.

Example 2

A tread rubber layer has a thickness of 10.0 mm and a groove has a depth of 8.2 mm. For a cap layer, a ratio to the tread rubber layer is 80% and a rubber hardness (JIS A hardness) is 64. On the other hand, for a base layer, the ratio to the tread rubber layer is 20% and the rubber hardness is 60. The number of convex portions is three. A height h1 of the convex portion is 3 mm which is 37% of a depth d1 of the groove.

Example 3

A tread rubber layer has a thickness of 10.0 mm and a groove has a depth of 8.2 mm. For a cap layer, a ratio to the tread rubber layer is 80% and a rubber hardness (JIS A hardness) is 64. On the other hand, for a base layer, the ratio to the tread rubber layer is 20% and the rubber hardness is 60. The number of convex portions is four. A height h1 of the convex portion is 3 mm which is 37% of a depth d1 of the groove.

Example 4

A tread rubber layer has a thickness of 10.0 mm and a groove has a depth of 8.2 mm. For a cap layer, a ratio to the tread rubber layer is 80% and a rubber hardness (JIS A hardness) is 64. On the other hand, for a base layer, the ratio to the tread rubber layer is 20% and the rubber hardness is 60. The number of convex portions is five. A height h1 of the convex portion is 3 mm which is 37% of a depth d1 of the groove.

Example 5

A tread rubber layer has a thickness of 10.0 mm and a groove has a depth of 8.2 mm. For a cap layer, a ratio to the tread rubber layer is 80% and a rubber hardness (JIS A hardness) is 64. On the other hand, for a base layer, the ratio to the tread rubber layer is 20% and the rubber hardness is 60. The number of convex portions is six. A height h1 of the convex portion is 3 mm which is 37% of a depth d1 of the groove.

Example 6

A tread rubber layer has a thickness of 10.0 mm and a groove has a depth of 8.2 mm. For a cap layer, a ratio to the tread rubber layer is 60% and a rubber hardness (JIS A hardness) is 64. On the other hand, for a base layer, the ratio to the tread rubber layer is 40% and the rubber hardness is 60. The number of convex portions is three. A height h1 of the convex portion is 4 mm which is 49% of a depth d1 of the groove.

Example 7

A tread rubber layer has a thickness of 10.0 mm and a groove has a depth of 8.2 mm. For a cap layer, a ratio to the tread rubber layer is 60% and a rubber hardness (JIS A hardness) is 64. On the other hand, for a base layer, the ratio to the tread rubber layer is 40% and the rubber hardness is 60. The number of convex portions is three. A height h1 of the convex portion is 2 mm which is 24% of a depth d1 of the groove.

Example 8

A tread rubber layer has a thickness of 10.0 mm and a groove has a depth of 8.2 mm. For a cap layer, a ratio to the tread rubber layer is 60% and a rubber hardness (JIS A hardness) is 64. On the other hand, for a base layer, the ratio to the tread rubber layer is 40% and the rubber hardness is 60. The number of convex portions is three. A height h1 of the convex portion is 1.5 mm which is 18% of a depth d1 of the groove.

tread rubber layer is 80% and a rubber hardness (JIS A hardness) is 64. On the other hand, for a base layer, the ratio to the tread rubber layer is 20% and the rubber hardness is 60. The number of convex portions is one. A height h1 of the convex portion is 3 mm which is 37% of a depth d1 of the groove.

Comparative Example 3

A tread rubber layer has a thickness of 10.0 mm and a groove has a depth of 8.2 mm. For a cap layer, a ratio to the tread rubber layer is 60% and a rubber hardness (JIS A hardness) is 64. On the other hand, for a base layer, the ratio to the tread rubber layer is 40% and the rubber hardness is 60. The number of convex portions is three. A height h1 of the convex portion is 5 mm which is 61% of a depth d1 of the groove.

Comparative Example 4

A tread rubber layer has a thickness of 10.0 mm and a groove has a depth of 8.2 mm. For a cap layer, a ratio to the tread rubber layer is 60% and a rubber hardness (JIS A hardness) is 64. On the other hand, for a base layer, the ratio to the tread rubber layer is 40% and the rubber hardness is 60. The number of convex portions is three. A height h1 of the convex portion is 1 mm which is 12% of a depth d1 of the groove.

TABLE 1

|  | Example 1 | Example 2 | Example 3 | Example 4 | Example 5 | Example 6 | Example 7 | Example 8 | Comp. Example 1 | Comp. Example 2 | Comp. Example 3 | Comp. Example 4 |
|---|---|---|---|---|---|---|---|---|---|---|---|---|
| Cap rubber |  |  |  |  |  |  |  |  |  |  |  |  |
| Ratio (%) | 80 | 80 | 80 | 80 | 80 | 60 | 60 | 60 | 80 | 80 | 60 | 60 |
| Rubber hardness (JISA) | 64 | 64 | 64 | 64 | 64 | 64 | 64 | 64 | 64 | 64 | 64 | 64 |
| Base rubber |  |  |  |  |  |  |  |  |  |  |  |  |
| Ratio (%) | 20 | 20 | 20 | 20 | 20 | 40 | 40 | 40 | 20 | 20 | 40 | 40 |
| Rubber hardness (JISA) | 60 | 60 | 60 | 60 | 60 | 60 | 60 | 60 | 60 | 60 | 60 | 60 |
| Number of covex portions | 2 | 3 | 4 | 5 | 6 | 3 | 3 | 3 | 0 | 1 | 3 | 3 |
| Height of covex portion (mm) | 3 | 3 | 3 | 3 | 3 | 4 | 2 | 1.5 | 0 | 3 | 5 | 1 |
| Ratio of height of convex portion (%) | 37 | 37 | 37 | 37 | 37 | 49 | 24 | 18 | 0 | 37 | 61 | 12 |
| Durability at high speed |  |  |  |  |  |  |  |  |  |  |  |  |
| Braking speed · time (km/h-min) | 280-8 | 280-15 | 280-7 | 280-9 | 270-18 | 280-17 | 280-7 | 280-5 | 270-5 | 270-6 | 270-16 | 270-13 |

Comparative Example 1

A tread rubber layer has a thickness of 10.0 mm and a groove has a depth of 8.2 mm. For a cap layer, a ratio to the tread rubber layer is 80% and a rubber hardness (JIS A hardness) is 64. On the other hand, for a base layer, the ratio to the tread rubber layer is 20% and the rubber hardness is 60. The number of convex portions is zero.

Comparative Example 2

A tread rubber layer has a thickness of 10.0 mm and a groove has a depth of 8.2 mm. For a cap layer, a ratio to the As shown in the Table 1, the tire is broken in a speed region of 280 km/h in each of the examples. In each of the comparative examples, the tire is broken in a speed region of 270 km/h. Accordingly, it is apparent that the tire according to each of the examples is excellent in the durability at a high speed.

What is claimed is:

1. A pneumatic tire comprising a tread having a base layer provided on an inside in a radial direction and a cap layer provided on an outside in the radial direction and provided with a groove on an outer peripheral surface constituting a tread surface, thereby forming a plurality of circular land portions, wherein the base layer has a hardness set to be lower than that of the cap layer, the base layer is provided with a plurality of circular convex portions which is arranged in an axial direction, is protruded in the radial direction and is extended in a circumferential direction, a plurality of circular convex portions is provided in one circular land portion, the circular convex portions being buried in the circular land portion and a height h1 thereof is set to be 15% to 50% of a depth d1 of the groove, and a height $\Delta h$ of a base bottom portion of the base layer is set to be equal to or smaller than 1.6 mm from an inner bottom portion of the groove.

2. The pneumatic tire according to claim 1, wherein the base layer is constituted by a styrene-butadiene rubber.

3. The pneumatic tire according to claim 1, wherein the base layer has a JIS A hardness set to be 55 to 65.

4. The pneumatic tire according to claim 1, wherein two to five circular convex portions are provided in one circular land portion.

* * * * *